United States Patent [19]

Warkentin

[11] 4,232,496

[45] Nov. 11, 1980

[54] GROMMET ASSEMBLY FOR COMPOSITE PANELS

[75] Inventor: Roy Warkentin, Lomita, Calif.

[73] Assignee: Tridair Industries, Milwaukee, Wis.

[21] Appl. No.: 34,105

[22] Filed: Apr. 30, 1979

[51] Int. Cl.³ .............................. E04B 1/66; F16B 5/02
[52] U.S. Cl. ............................................ 52/403; 16/2; 52/309.2; 52/506; 52/787; 277/180; 403/288
[58] Field of Search ............................ 277/180; 16/2; 52/309.2, 787, 506, 513, 403; 403/288, 388

[56] References Cited

U.S. PATENT DOCUMENTS

| | | | |
|---|---|---|---|
| 2,771,259 | 11/1956 | Laystrom | 403/288 X |
| 2,915,152 | 12/1959 | Graham | 403/288 |
| 3,009,845 | 11/1962 | Wiser | 52/309.2 X |
| 3,231,288 | 1/1966 | Hensien | 277/180 X |
| 3,355,850 | 12/1967 | Rohe | 52/787 |
| 3,443,473 | 5/1969 | Tritt | 52/787 |

*Primary Examiner*—Alfred C. Perham

[57] ABSTRACT

An assembly for installing and using a grommet in a panel of composite material for attachment to a substructure, having interposed therebetween a layer of a compressible gasket material, includes a flared grommet with a spacer disposed between the flare and the panel to protect the panel corners in the grommet flaring operation, to distribute the concentrated load imposed on the panel when the grommet end is flared, and to shim the flared end against the substructure to eliminate the imposition of an unsupported load on the panel as a fastener connecting the grommet and substructure is drawn up to secure the panel and substructure together.

4 Claims, 4 Drawing Figures

U.S. Patent      Nov. 11, 1980      4,232,496

GROMMET ASSEMBLY FOR COMPOSITE PANELS

BACKGROUND OF THE INVENTION

The present invention relates to the field of structural panel fasteners and, more particularly, pertains to the use of a structural grommet to reinforce the mounting hole in a panel of composite material and a fastening assembly for use therewith in attaching the composite panel to a substructure.

Structural panels made of composites of light-weight materials are being used more extensively in many applications requiring high strength and relatively light weight. For example, the high tensile strength and stiffness of structural panels made of graphite fibers disposed in a thermoplastic resin matrix make these panels extremely useful in aerospace applications where a high strength-to-weight ratio is important. However, these composite panels tend to be very brittle and conventional fastening means, used successfully in other types of structural panels, may fracture, chip, or crush composite panels when applied in their usual manner.

One component of a fastener assembly used extensively in various light-weight structural panels is a reinforcing grommet. A grommet is a hollow cylindrical insert which is installed in a hole in a panel to reinforce the opening for receipt of a fastener element, such as a bolt. A grommet typically has an enlarged head by which it is held in one face of the panel and an extended cylindrical opposite end which is flared radially to engage the other panel face surrounding the hole to secure the grommet in place.

When a conventional flared grommet is installed and used in a structural panel of composite material, it has been found that damage to the panel may occur in several ways. First, the radial flaring of the grommet may crush the panel corner at the junction of the surfaces of the hole and the panel, which can propagate cracks and cause high stress concentrations. Second, the free end of the flared portion is, turned radially outwardly and back against the panel surface when the grommet is installed, resulting in sharp line contact which may chip or crack the panel surface and lead to immediate failure or subsequent failure when the fastener is loaded. Finally, when the panel and substructure are separated with a gasket material, which material must obviously not occupy the space immediately surrounding the flared grommet end, and the panel and substructure are drawn together by the fastener disposed in the grommet, the unsupported load imposed on the panel through the grommet may cause the panel to fracture and fail.

SUMMARY OF THE INVENTION

The preferred embodiment of the present invention comprises a flared grommet and spacer assembly particularly adapted for use in a composite structural panel which is separated by a gasket material from the substructure to which it is attached. The spacer is adapted to protect the corner of the panel hole from being crushed during the flaring process, distribute the load imposed on the panel surface by the flared free end of the grommet, and shim the flared end against the substructure. Varying spacer thicknesses can be used to compensate for different gaskets thicknesses and for varying grommet lengths.

DETAILED DESCRIPTION OF THE PREFERRED EMBODIMENT

Figure 1:
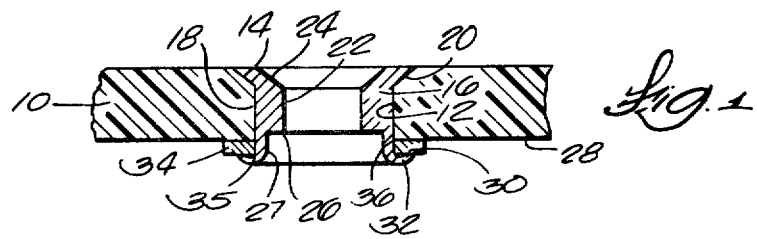
FIG. 1 is a vertical section through a composite panel taken on the axis of a grommet assembly of the present invention.
Figure 2:
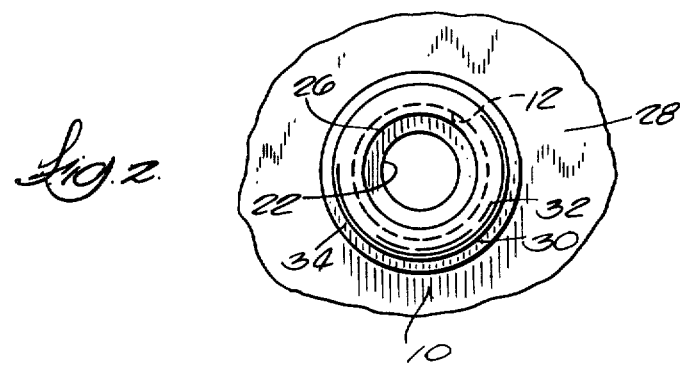
FIG. 2 is an axial end view of the flared end of the grommet assembly of FIG. 1.

In FIGS. 1 and 2, a structural panel 10, such as one comprised of graphite fibers disposed in a thermoplastic resin matrix, has a cored or drilled through hole 12 which may be countersunk in the outer panel face as at 14. Secured in the hole 12 is a structural grommet 16. The grommet 16 is of a typical and well known construction, including a cylindrical outer surface 18 just slightly smaller than the diameter of the hole 12 and one tapered end 20 adapted to fit in the countersunk portion 14 of the hole 12 to provide a flush mount with the outer panel surface. The grommet has a cylindrical through bore 22 with a countersink 24 in the tapered end 20 and a counterbore 26 in the other end.

The counterbore 26 defines a thin-walled cylindrical extension 27 which protrudes axially beyond the inner face 28 of the panel. The end of cylindrical extension 27 is radially flared in a known manner as with an axially operated flaring punch and die (not shown). In the flaring operation, the remote end 30 is turned back toward the inner surface 28 of the panel 10 to form a semi-toroidal flare 32.

To protect the panel surface 28 against chipping or cracking as a result of the end 30 of the flare 32 being brought to bear against the panel, an annular spacer 34 is interposed axially between the flare 32 and the panel surface. The spacer 34 has a radical width between its inner and outer diameters substantially greater than the corresponding width of the end 30 of the flare 32. As a result, the load imposed on the panel in the flaring operation is distributed over a large area with a consequent reduction in the compressive stress on the panel surface 28.

In addition, the spacer 34 protects the panel corner 36 at the junction of the hole 12 and the panel surface 28 from being crushed by contact of the inner surface of the flare 32 as it is formed in the flaring operation. This portion of the flare instead bears directly on the axially outer and radially inner corner 35 of the spacer. To provide adequate protection against crushing, the inner diameter of the spacer 34 should equal the diameter of the panel hole 12. In addition, the axial thickness of the spacer should be great enough so that no portion of the flare contacts the panel corner 35.

Figure 3:
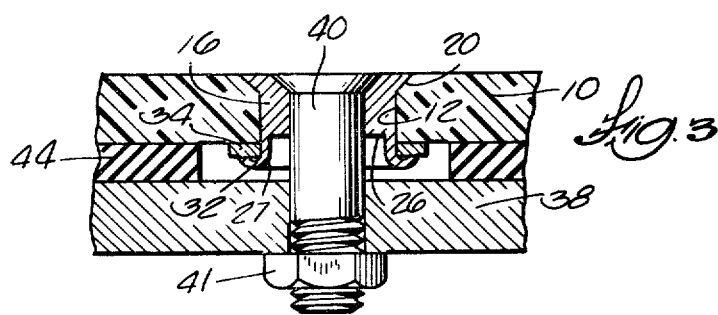
FIG. 3 is a vertical section through a panel showing the grommet assembly of FIG. 1 prior to attachment of the panel to a substructure.
Figure 4:
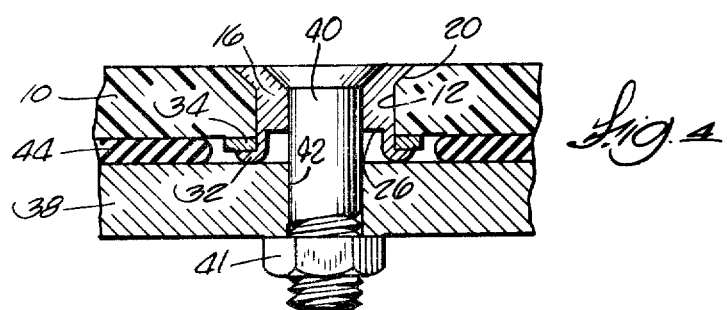
FIG. 4 is a vertical section similar to FIG. 3 showing the grommet assembly after attachment of the panel to the substructure.

Referring to FIGS. 3 and 4, the grommet assembly just described may be conveniently used to attach the composite panel 10 to a substructure 38. If the panel and substructure are attached directly together (as with a bolt 40 disposed in the grommet 16 and extending through an aligned hole 42 in the substructure and secured with a nut 41), the grommet flare 32 will be brought to bear against the substructure. In such a case, the spacer 34 will act to distribute the added compressive load on the panel as the bolt and nut are drawn up.

In many applications, however, a gasket is interposed between the panel and the substructure, primarily as a seal against the entry of moisture. The gasket material 44 is generally made of some rubber-like synthetic which is compressible to some degree, with limits of compressibility being determined by certain physical characteristics of the material.

Thus, with a gasket material of low compressibility, the practical limit may be dictated simply by the material's maximum compressibility. If the gasket material 44 as shown in FIG. 3 has been compressed to its physical limit (by tightening bolt 40 and nut 41), a gap exists between the end of the grommet flare 32 and the substructure 38 within the space around the grommet and bolt which, of course, cannot be occupied by the gasket material. Further tightening of the fastening means to properly draw the panel 10 to the substructure will impose an unsupported shear load on the panel through the grommet. Such an unsupported load may cause the brittle composite panel to fracture and fail.

On the other hand, with a gasket material of high compressibility, the practical limit of compressibility may be dictated by the tendency of the material to creep and flow if compressed excessively. Such excessive compression will lead to the loss of the seal and resultant leakage.

In the foregoing cases where the compressibility of the gasket material is or must be limited, the spacer 34 can be used to shim the end of the grommet flare 32 into contact with the substructure before either the panel is overloaded or the gasket is compressed excessively. In the latter case, for example, and referring particularly to FIGS. 3 and 4, the axial thickness of the spacer 34 is selected so that the combined thickness of the spacer and the flared end 32 is slightly greater than the thickness of the gasket material 44 at its limit of maximum compressibility. Thus, if in FIG. 3 a gasket 44 of relatively high compressibility is compressed by the further tightening of nut 41 on bolt 40, selection of a spacer 34 of appropriate thickness will allow the flared end 32 of the grommet to bottom on the substructure, as shown in FIG. 4, before the compression of the gasket causes it to adversely creep or flow. As in the case of initial installation and flaring of the grommet 16, the spacer 34 acts to distribute the additional load on the panel 10 as a result of the grommet bottoming on the substructure.

I claim:

1. An assembly for attaching a panel of relatively brittle composite material to a substructure, separated therefrom with a layer of gasket material compressible to a maximum limit, comprising:
    (1) aligned circular holes in the panel and the substructure;
    (2) the gasket material defining a space radially around the holes and axially between the panel and the substructure;
    (3) a structural grommet disposed in the panel hole and having a radially flared end extending into the space for securing the grommet in the panel;
    (4) fastening means disposed in the grommet and the hole in the substructure for drawing the panel and substructure together and compressing the gasket material;
    (5) spacer means interposed between the panel inner face and the flared grommet end; and,
    (6) the spacer means and grommet end having a combined thickness in the axial direction of the space between the panel and substructure greater than the thickness of the gasket material at its limit of maximum compressibility.

2. As assembly as defined in claim 1 wherein the portion of the flared grommet end farthest from the panel engages the substructure to limit said fastening means.

3. An assembly as defined in claim 2 wherein said spacer means comprises an annular washer having an inner diameter less than and an outer diameter greater than the maximum diameter of the flared grommet end.

4. An assembly as defined in claim 3 wherein the inner diameter of the annular washer is substantially equal to the diameter of the panel hole.

* * * * *